United States Patent
Heyman

[11] Patent Number: 5,865,689
[45] Date of Patent: Feb. 2, 1999

[54] GOLF-LEVELER DEVICE

[76] Inventor: Arnold M. Heyman, 2149 Ridge Dr., Los Angeles, Calif. 90049

[21] Appl. No.: 6,099

[22] Filed: Jan. 13, 1998

[51] Int. Cl.[6] .............................. A63B 57/00; G01C 9/00
[52] U.S. Cl. ............................................ 473/404; 33/379
[58] Field of Search ....................... 473/404, 241, 473/407; 33/365, 377, 379, 389

[56] References Cited

U.S. PATENT DOCUMENTS

| | | | |
|---|---|---|---|
| 3,909,004 | 9/1975 | Vella | 473/241 |
| 4,082,286 | 4/1978 | La Breche . | |
| 4,085,515 | 4/1978 | Darden | 33/377 |
| 4,260,151 | 4/1981 | Weaver . | |
| 4,824,114 | 4/1989 | Catalano . | |
| 4,984,791 | 1/1991 | Labell . | |
| 5,157,842 | 10/1992 | Swanda . | |
| 5,174,572 | 12/1992 | Ho . | |
| 5,209,470 | 5/1993 | Cimaroli et al. . | |
| 5,326,096 | 7/1994 | H'Doubler | 473/404 |
| 5,330,179 | 7/1994 | Hampel . | |
| 5,409,212 | 4/1995 | Arnett . | |
| 5,411,253 | 5/1995 | Kimble | 473/404 |
| 5,476,258 | 12/1995 | Frisone . | |
| 5,503,393 | 4/1996 | Casperson | 473/404 |
| 5,669,832 | 9/1997 | Lehse | 473/404 |

*Primary Examiner*—Steven Wong
*Attorney, Agent, or Firm*—Loeb & Loeb, LLP

[57] ABSTRACT

A golf-leveler device, process for making a golf-leveler device, and a method of using a golf-leveling device comprising a 360-degree dome leveler housed within and at one end of a standard golf ball and having a base at the opposite end. Both the dome leveler and the base are inserted into a cylindrical hole drilled through the origin of the spherical golf ball, and secured thereto by glue or adhesive means. The base includes a bottom portion that is a flat plane having a diameter less than the diameter of the golf ball, and being orthogonal to the centerline axis of the hole drilled through the golf ball. A bubble is positioned within a transparent oily liquid within the dome leveler such that when the golfer places the device on a location on a green on a golf course, the bubble indicates the direction that that particular location on the green slants upward.

5 Claims, 1 Drawing Sheet

GOLF-LEVELER DEVICE

FIELD OF THE INVENTION

This invention relates generally to the field of golf-leveling devices, and more particularly to an apparatus, process for making and method of using a golf-leveling device housed within a standard golf ball and having a base inserted into a cylindrical hole drilled through the golf ball at one end, and a 360-degree dome level inserted into the hole at the opposite end. The user may temporarily position the golf-leveler device at various locations between his or her golf ball and the hole on a particular green to ascertain the direction of the slope of the green at the selected locations.

BACKGROUND OF THE INVENTION

Reading the green is an integral part of putting while playing a game of golf. Changes in the elevation of different portions of the green, that is, sloping of the green, can sometimes be deceiving to the naked eye due to the surrounding environment. Optical illusions caused by angles of environmental features—such as mountains, valleys, gulleys, deserts and so forth—can often makes subtle slants downward in one direction appear to be upward slants. If the golfer mistakingly compensates for sloping in the opposite direction, the accuracy of the putt faces obvious peril.

There have been several attempts to provide leveler devices for golfers to aid them in reading the slope of the green. Some of these devices employ 2-dimensional or linear levelers, often housed within golf clubs, handles, putter blades and so forth. Others include two perpendicularly float levels to show the relative sloping in two directions. Still others employ plumb bobs, pendulums, steel balls and other mechanisms for determining various attributes and parameters of the sloping of a particular green.

These various prior-art leveler devices are either cumbersome, time-consuming and complicated to use, bulky to store, or an affront to golf etiquette. The linear levelers, no matter how housed, fail to clearly indicate the direction of the slope of the green without continually repositioning the device in different rotational positions. The devices having two linear float levelers positioned perpendicularly require mental gymnastics to determine the actual slope.

The process for making these various prior-art devices is typically time-consuming, using costly materials, and employing expensive and complex machinery and processing steps.

It would thus be desireable to have a small, lightweight leveler that may be readily carried in one's pocket or golf-ball compartment in a golf bag and that readily and unambiguously indicates the direction of the slope of the green at any particular location that the device is positioned. It would also be desireable to package such a golf-leveler device in a housing that presents an appropriate image for golfers and is not an affront to golfing etiquette. If would further be desireable to provide a cost-effective device that may be made by a simple process using inexpensive materials.

SUMMARY OF THE INVENTION

The present invention solves the above-mentioned problems by positioning a dome leveler at the top of a standard golf ball, and securing a flat base to the opposite end. The flat bottom portion of the base is preferably circular and having a diameter that is slightly less than the diameter of the golf ball. The golfer then may place the golf-leveler device at various positions between his or her ball and the hole on the green and immediately determine the direction of the slope of the green at that location. The golfer may then putt in accordance with the direction of the slope of the green.

Preferably, a cylindrical hole is drilled through the golf ball along the centerline, that is, such that the centerline of the hole passes through the origin of the spherical golf ball. A plastic base having a cylindrical insert portion and a flat disc-shaped bottom portion is inserted in one end of the hole. A standard off-the-shelf dome leveler is inserted in the other end of the hole such that the transparent top dome is generally flush with or in-line with the exterior curvature of the golf ball. Both the base and dome leveler are glued or otherwise secured in position by any adhesive means.

Preferably, the diameter of the cross-sectional area of the cylindrical portion of the base and the dome leveler are substantially the same, allowing the bottom portion of the dome leveler (that is, that portion opposite the transparent dome surface) to rest against the free edge of the cylindrical portion of the base. The diameter of the hole is slightly larger than the diameter of the base and dome leveler, providing enough space to insert each component into the hole and accomodate whatever glue or adhesive is used. However, other embodiments are also possible.

BRIEF DESCRIPTION OF THE DRAWINGS

The several features and advantages of the present invention will be better understood from a reading of the following detailed description in conjunction with the drawings, in which.

DETAILED DESCRIPTION OF THE INVENTION

Figure 1:
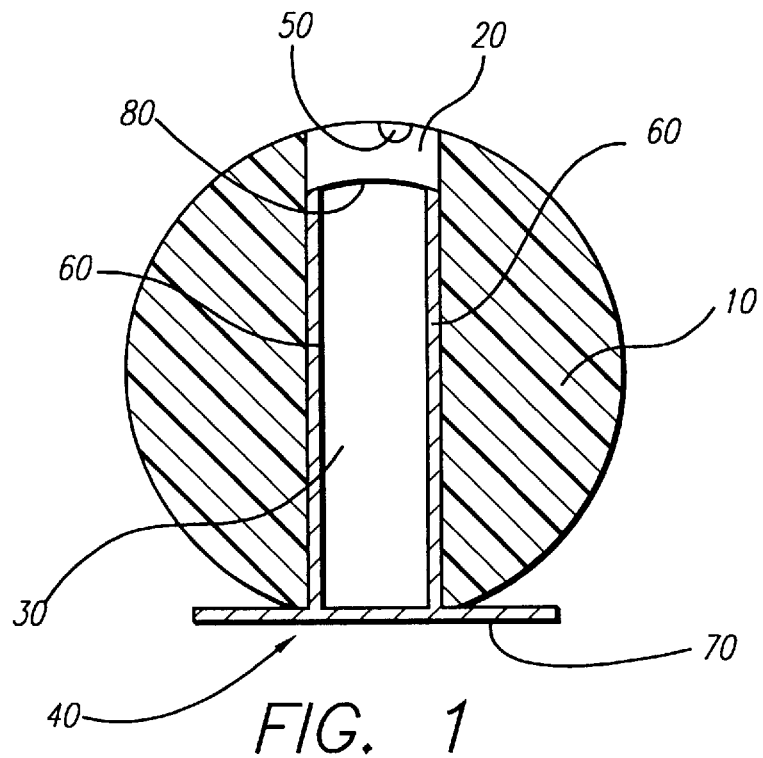
FIG. 1 shows a side view cut-away portion of the present invention.

Identical reference numerals in the drawings denote the same elements throughout the various drawings. However, the various drawings are not drawn to scale, but for illustrative purposes of the basic relative configurations.

FIG. 1 shows the preferred embodiment of the present invention. Golf ball 10 has cylindrical hole 30 drilled through its origin so that the remaining portion of golf ball 10 is symmetrical around the centerline axis of hole 30. Base 40 is inserted into one end of hole 30 ("the bottom end") such that cylindrical portion 60 is positioned within hole 30 and such that base portion 70 is flush against, or substantially near, the bottom end of golf ball 10. The plane of base portion 70 is orthogonal to the centerline axis of hole 30, and its diameter is prefereably slightly less than the diameter of golf ball 10.

Dome leveler 20 is positioned within the other end of hole 30 ("the top end") so that dome bottom portion 80 rests against the free edge of cylindrical portion 60 of base 40, and further so that the transparent domed side (the side opposite dome bottom portion 80) is flush with or in line with the exterior curvature of golf ball 10. Both dome leveler 20 and cylindrical portion 60 are secured in place by glue or any standard adhesive, epoxy or other means for securing these components in place.

Dome leveler 20 is preferably an acrylic circular vial, model SM053 by Johnson Level & Tool Manufacturing Co., Inc., in Mequon, Wis., However, other dome levelers could be used, such as one by Empire Level Mfg. Corp., in Waukesha, Wis. Dome leveler 20 comprises air bubble 50 formed within an oil-based viscous liquid medium within a transparent acrylic or plastic casing.

The process for making the golf-leveler device is straightforward. An appropriate sized hole 30 is drilled through the center of golf ball 10, which is a standard golf ball, or alternately a similarly sized spherical object. Base 40 is coated with glue or an adhesive (not shown) and is inserted into the bottom end of ball 10. Dome leveler 20 is similarly coated with glue or an adhesive (not shown) and is inserted into the top end of ball 10. The glue or adhesive is placed in appropriate positions so to properly secure dome leveler 20 and base 40 within ball 10, as is well known to those skilled in the art.

Figure 2:
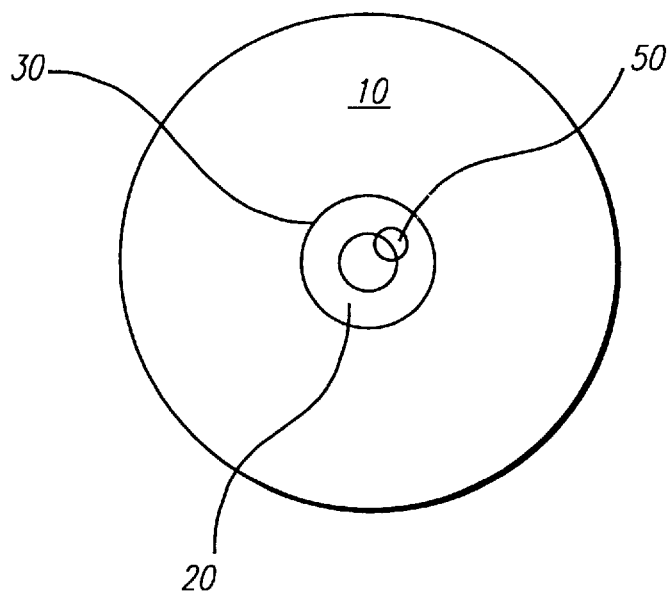
FIG. 2 shows a top view of the present invention.

FIG. 2 shows a top view of the golf-leveler device, looking down through the top or domed portion of dome leveler 20. Bubble 50 is shown slightly askewed from the center of the dome, indicative of the direction at which the green (or other surface) slopes upward.

The golfer may then use the golf-leveler device by placing it at various locations on the green, typically between the golfer's ball and the hole on the green, to determine the direction that the green slopes at the particular locations. The golf-leveler device is readily kept in the golfer's pocket, in a golf bag along with usable golf balls, or in any other convenient location. Indicia is preferably printed on the exterior of the ball to make the golf-leveler device appear as any ordinary golf ball from a distance.

Additional advantages and modifications will readily occur to those skilled in the art. Thus while the preferred embodiment of the present invention has been disclosed and described herein, the invention in its broader aspects is not limited to the specific details, methods and representative devices shown and described herein. It will be understood by those skilled in the art that various changes in form and detail may be made therein without departing from the spirit and scope of the general inventive concept as defined by the appended claims and their equivalents.

What is claimed is:

1. A golf-leveler device comprising:
 a spherical golf ball having cylindrical interior walls defining a cylindrical hole, such that the centerline of the hole passes through the origin of the spherical golf ball;
 a base having a bottom portion and a cylindrical portion, the bottom portion including a plane that is orthogonal to the centerline, and the cylindrical portion being secured within a first end of the hole; and
 a dome leveler secured within a second end of the hole opposite the base, the dome leveler including an air bubble surrounded by a transparent liquid housed within the dome leveler.

2. The golf-leveler device of claim 1, in which the bottom portion of the base has a diameter that is less than the diameter of the golf ball.

3. The golf-leveler device of claim 2, in which the cylindrical portion of the base has a free edge, and in which the dome leveler includes a bottom portion that is positioned adjacent to and secured to the free edge of the cylindrical portion of the base.

4. A process for making a golf-leveler device comprising the steps of:
 drilling a cylindrical hole in a golf ball such that the centerline of the hole passes through the origin of the golf ball;
 providing a base, having a cylindrical portion, and a dome leveler;
 applying glue or adhesive means to at least one of the interior walls of the golf ball that define the hole, the cylindrical portion of the base, and the dome leveler; and
 inserting each of the cylindrical portion of the base and the dome leveler into the hole at opposite ends thereof;
 wherein the base and dome leveler are secured into position within the golf ball, and further wherein the base is secured into a position in which a plane thereof extends orthogonal to the centerline of the hole.

5. A method of using a golf-leveler device that incudes a base and a dome leveler having an air bubble surrounded by a transparent liquid and positioned opposite the base, the dome leveler being three-dimensional so that the air bubble thereof can move in any direction relative to a circular periphery of a dome extending 360° around the dome, comprising the steps of:
 placing the golf-leveler device at a particular location on a green of a golf course generally between the golfer's ball and the hole of the green;
 observing the direction that the air bubble within the dome leveler moves relative to the centerline of the golf-leveler device, thereby indicating the direction relative to the periphery of the dome in which the green slopes upward; and
 putting the golf ball toward the hole of the green, taking into consideration the direction of the slope of the green at the particular location between the ball and the hole.

\* \* \* \* \*